(No Model.) 2 Sheets—Sheet 1.
A. H. MERRIMAN.
CLUTCH MECHANISM FOR POWER PRESSES.
No. 468,506. Patented Feb. 9, 1892.
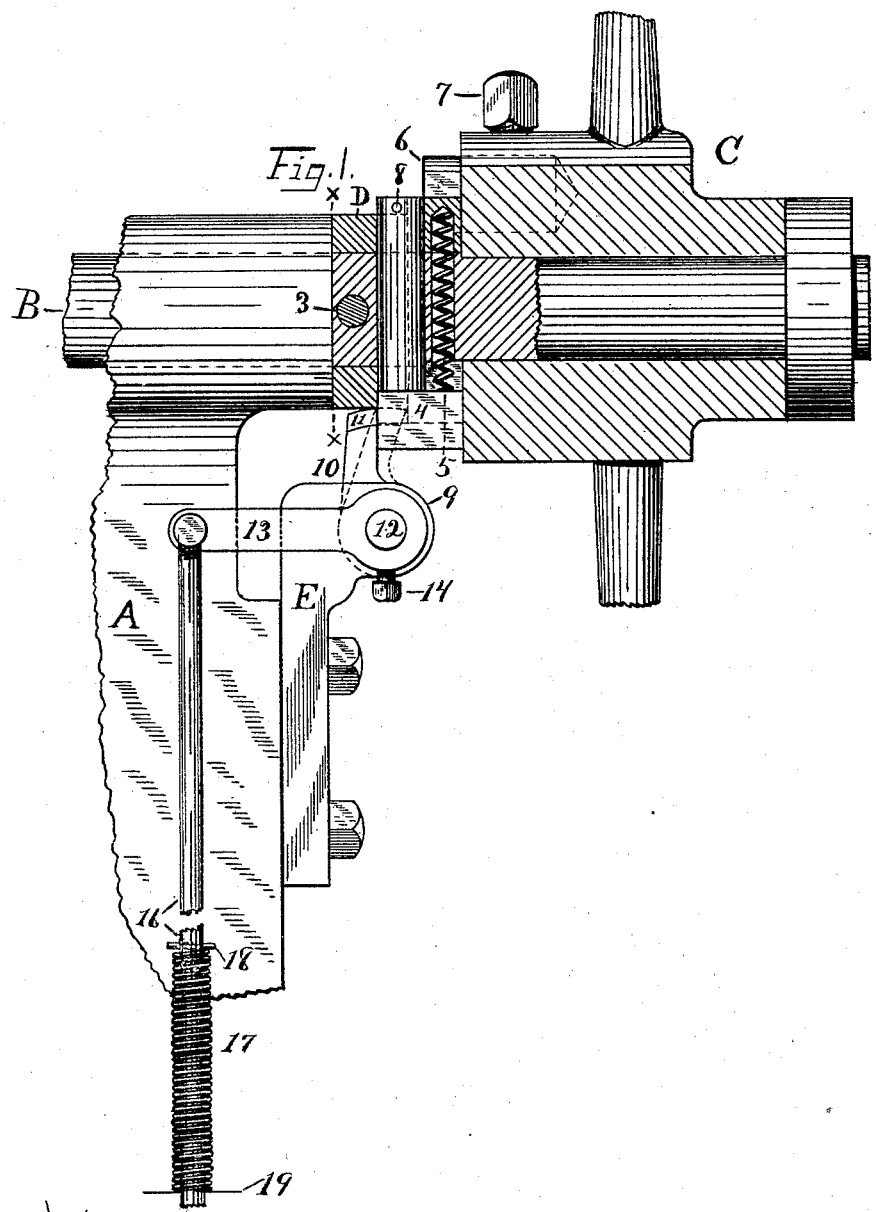
Witnesses.
Hilmer Svenson
Arthur G Beach
Inventor.
Alanson H. Merriman
By James Shepard.
Atty.

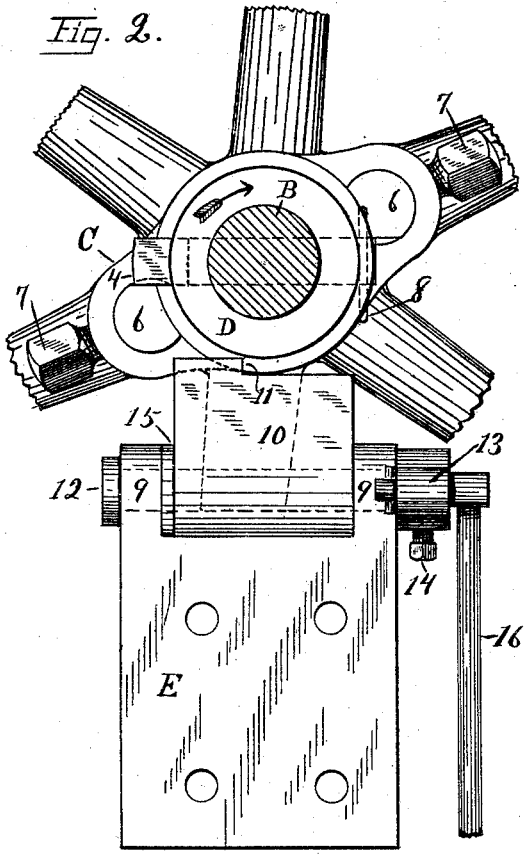

UNITED STATES PATENT OFFICE.

ALANSON H. MERRIMAN, OF MERIDEN, CONNECTICUT.

CLUTCH MECHANISM FOR POWER-PRESSES.

SPECIFICATION forming part of Letters Patent No. 468,506, dated February 9, 1892.

Application filed October 10, 1891. Serial No. 408,350. (No model.)

*To all whom it may concern:*

Be it known that I, ALANSON H. MERRIMAN, a citizen of the United States, residing at Meriden, in the county of New Haven and State of Connecticut, have invented certain new and useful Improvements in Clutch Mechanism for Power-Presses and other Machines, of which the following is a specification.

My invention relates to improvements in clutch mechanism for power-presses; and the objects of my improvements are cheapness and simplicity of construction and efficiency in operation.

In the accompanying drawings, Figure 1 is a partial section and partial side elevation of my clutch mechanism and so much of a power-press as is necessary to show its connection therewith; and Fig. 2 is a front elevation of the clutch mechanism, a portion of the driving-wheel, and a sectional view of the press-shaft on the line $x\ x$ of Fig. 1.

A designates a portion of the frame of the press, B its shaft, and C the hub of the driving-wheel loosely mounted on said shaft. At the rear of the frame B a collar D is secured to the shaft B by means of the pin 3. This collar and shaft are bored diametrically to receive the round shank of the radially-sliding clutch-pin 4 and the spring 5. The head of the clutch-pin 4 is squared and extends to one side of the shank, so that one end of the spring 5 may press upon the inner end of said head with a constant tendency to throw said pin outwardly. The collar and press-shaft are recessed at the head end of the clutch-pin 4, said recess having the same form as the head of the pin to permit the head of said pin to be forced inwardly and to prevent it from rotating on its shank. The hub C of the wheel is provided with two driving-studs 6 6, that project from the front end of said hub, as shown. One of these studs may be omitted, if desired. They may be formed on or secured to the wheel-hub in any ordinary or suitable manner—as, for instance, let into a socket and held by a set-screw 7. I prefer to arrange the spring 5 and clutch-pin 4, as shown, with the spring nearest the wheel-hub and the shank of the pin farthest therefrom, so that the tail end of said shank will not engage the studs 6 6 even if said shank should project radially beyond the circle described by the inner faces of said studs. The sliding clutch-pin may have its outward movement limited by any suitable means—as, for instance, by the transverse pin 8 at the tail end of the shank, which pin bears on the collar D. Upon the press-frame, which furnishes a stationary support, I secure the bracket E, having ears 9, within which I pivot the oscillating trip 10, having a stop-shoulder 11. This trip is rigidly mounted on its pivotal shaft 12, and to one end of said shaft the lever-arm 13 is rigidly secured in any proper manner—as, for instance, by means of the set-screw 14. I also prefer to arrange on said shaft at a point between one of the bracket-ears and that end of the trip which is behind the stop-shoulder 11 a washer 15 of some slightly-yielding material to lessen somewhat the shock of a blow upon said shoulder; but such washer may be omitted, if desired. An operating-rod 16 extends downward from the lever 13 to a treadle or other operating mechanism for pulling down on said rod to swing the trip from the position indicated by broken lines in Fig. 1 to that shown in full lines. Some means should be provided for returning said rod and trip to their normal position—as, for instance, the spring 17, one end of which presses upon a shoulder or pin on said rod, as at 18, while the other end bears upon some stationary support, as indicated by the line 19. The wheel-hub and shaft in Fig. 2 are represented as having moved one-eighth of a revolution beyond the position represented in Fig. 1, the direction of revolution being represented by the dart in Fig. 2.

When the operating-rod is depressed, as shown in Fig. 1, the trip is brought toward the press-frame so far that the shaft may revolve without having the head of the clutch-pin engage the trip. The spring 5 has a constant tendency to hold the head of the pin out, as shown, whereby one of the studs 6 on the hub of the driving-wheel engages the head of said pin and necessitates the revolution of the shaft with the wheel so long as the operating-rod is held down. Upon releasing said rod the spring 17 raises it and the lever-arm 13, when the trip 10, which is rigidly secured to the same shaft as said arm, is also moved from the position shown in full lines in Fig. 1 to that indicated by broken lines. The upper edge of the trip to the right of the stop-shoulder is straight and forms a tangent to the path of the head of the clutch-pin, whereby when said head strikes said upper edge the pin is forced inwardly as the shaft B revolves until its head is inside of the circle described by the inner face of the studs 6, and consequently the studs on the wheel-hub may pass by the head of the pin. Said head is engaged by the stop-shoulder 11 of the trip, whereby the clutch-pin and press-shaft are stopped with the shaft in a given position. If the wheel is driven at a very high speed, the interposed washer 15 at the end of the trip will relieve the clutch of any severe shock; but the wheel can be run at quite a high speed without a severe shock even if said washer is omitted. Upon again depressing the operating-rod the trip is brought from out of the path of the clutch-pin. All the weight of the clutch-pin and the force of the spring then immediately act to force said pin out again, when the first one of the studs 6 that comes along will engage it and drive the shaft, as before. The weight of the clutch-pin under the centrifugal force of the shaft may keep the pin out without the use of the spring 5; but the spring renders its action certain.

I have represented the collar D as enlarged on the end nearest the wheel-hub, so as to bring its periphery nearer the studs 6; but it is of course evident that the general construction and mode of operation would be the same if the said collar were of the same size throughout as at the end nearest the press-frame.

I have shown my clutch as applied to a press in which the shaft passes through solid bearings from front to rear, and hence the necessity of putting on the collar for a shoulder; but where the shaft runs from side to side and is in divided bearings the collar may be in the form of an integral shoulder of the shaft itself.

In some cases the clutch-pin and trip may be placed on the opposite end of the wheel-hub from that shown; but nothing more than mechanical skill will be required to make this and other changes to adapt my clutch mechanism to the different styles of ordinary power-presses. By my improvements the clutch mechanism operates with the greatest ease, works very smoothly, is certain in its action, and may be applied to a press that runs at the highest speed.

I claim as my invention—

The combination of the shaft, the driving-wheel having a driving-stud at one end of its hub, the radially-sliding clutch-pin, the oscillating trip having stop-shoulder, and mechanism for moving the edge of said trip into and out of the path of the head of said clutch-pin, substantially as described, and for the purpose specified.

ALANSON H. MERRIMAN.

Witnesses:
E. A. MERRIMAN,
F. E. MERRIMAN.